(12) United States Patent
Scheer et al.

(10) Patent No.: US 11,794,554 B2
(45) Date of Patent: Oct. 24, 2023

(54) METHOD FOR DETERMINING AIR QUALITY IN A PASSENGER COMPARTMENT OF A MOTOR VEHICLE

(71) Applicant: FORD GLOBAL TECHNOLOGIES, LLC, Dearborn, MI (US)

(72) Inventors: Volker Scheer, Roetgen (DE); Rainer Vogt, Aachen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 493 days.

(21) Appl. No.: 17/145,664

(22) Filed: Jan. 11, 2021

(65) Prior Publication Data

US 2021/0229520 A1 Jul. 29, 2021

(30) Foreign Application Priority Data

Jan. 24, 2020 (DE) .................. 102020101741.3

(51) Int. Cl.
*B60H 1/00* (2006.01)
*B60Q 9/00* (2006.01)

(52) U.S. Cl.
CPC ......... *B60H 1/008* (2013.01); *B60H 1/00985* (2013.01); *B60Q 9/00* (2013.01)

(58) Field of Classification Search
CPC ....... B60H 1/008; B60H 1/00985; B60Q 9/00
See application file for complete search history.

(56) References Cited

U.S. PATENT DOCUMENTS

| 6,298,291 | B1* | 10/2001 | Davis, Jr. ............... B60H 1/008 454/75 |
| 8,509,991 | B2 | 8/2013 | Bai | |
| 10,220,676 | B2* | 3/2019 | Kulthe .................. B60H 1/008 |
| 2004/0162016 | A1* | 8/2004 | Urbank ................. B60H 1/008 454/75 |
| 2015/0032266 | A1* | 1/2015 | Weast ............... B60H 1/00842 700/276 |
| 2016/0280160 | A1* | 9/2016 | MacNeille ......... G01C 21/3461 |
| 2016/0318368 | A1* | 11/2016 | Alger ............... G08G 1/096791 |
| 2019/0084369 | A1 | 3/2019 | Duan et al. |
| 2019/0366793 | A1 | 12/2019 | Giordano et al. |

FOREIGN PATENT DOCUMENTS

DE 102014011622 A1 3/2015
KR 20180038243 A 4/2018

* cited by examiner

*Primary Examiner* — Gertrude Arthur Jeanglaude
(74) *Attorney, Agent, or Firm* — Frank L. Lollo; MacMillan, Sobanski & Todd, LLC

(57) ABSTRACT

A method determines air quality in a passenger compartment (4) of a motor vehicle (2) based on measured data representative of outside air quality and an evaluation model for extrapolating interior air quality. Measured data (MD) is collected by at least one sensor (6) arranged outside the passenger compartment. The measured data is evaluated using a model (12) for the air quality in the passenger compartment (4) in order to determine output data (AD) indicative of the air quality in the passenger compartment (4). Then the output data is output to the occupants of the passenger compartment.

12 Claims, 3 Drawing Sheets

METHOD FOR DETERMINING AIR QUALITY IN A PASSENGER COMPARTMENT OF A MOTOR VEHICLE

CROSS REFERENCE TO RELATED APPLICATIONS

This application claims priority to application DE102020101741.3, filed in the German Patent and Trademark Office on Jan. 24, 2020, which is incorporated herein by reference in its entirety.

STATEMENT REGARDING FEDERALLY SPONSORED RESEARCH

Not Applicable.

BACKGROUND OF THE INVENTION

The present invention relates in general to determining the air quality in a passenger compartment of a motor vehicle, and, more specifically, to informing a driver and/or the passengers about the air quality.

Drivers and passengers of motor vehicles are increasingly concerned that air pollution from outside is affecting their health and their well-being. Passenger compartment filters (e.g., cabin air filters or pollen filters) are therefore integrated into air conditioning systems of motor vehicles and have in the meantime become part of the standard equipment of modern motor vehicles. Depending on the efficiency of the passenger compartment filter, the pollutant levels in the passenger compartment of the motor vehicle are significantly lower than outside, but the driver and the passengers may not be very aware of this beneficial effect.

In order to be able to give feedback about the protective effect of the passenger compartment filter, it is necessary to measure the pollutant concentration in the passenger compartment. However, sensors for detecting pollutants in the air are very expensive and/or not capable of measuring low pollutant concentrations with sufficient accuracy. Furthermore, for some pollutants, such as, for example, pollen, no sensors whatsoever are available that would be suitable for use as air quality sensors in a motor vehicle.

Published patent application US2019/0084369A1 discloses a method for determining the air quality in a passenger compartment of a motor vehicle, in which measured data collected by air quality sensors within passenger compartments of reference motor vehicles (probe cars) are read in and evaluated in order to determine the air quality in the passenger compartment of the motor vehicle. A method for determining the outside (atmospheric) air quality in the vicinity of a motor vehicle is known from U.S. Pat. No. 8,509,991B2 in which air quality is estimated based on traffic congestion. Another method in Korean patent KR20180038243A uses a vehicle location to shut off airflow into a passenger cabin when a vehicle moves into a hazardous area (such as a tunnel).

There is accordingly a need to show ways in which a determination of the air quality in a passenger compartment of a motor vehicle can be improved further.

SUMMARY OF THE INVENTION

An object of the invention is to achieve a method for determining the air quality in a passenger compartment of a motor vehicle. In particular, the method reads in measured data collected by at least one sensor arranged outside the passenger compartment, evaluates the measured data using a model for the air quality in the passenger compartment in order to determine output data indicative of the air quality in the passenger compartment, and outputs the output data to vehicle occupants.

Air quality as used herein refers to the condition of the air in terms of the proportion of air pollutants contained therein. The air pollutants can be, for example, the concentration of nitrogen monoxide (NO), nitrogen dioxide ($NO_2$), ozone ($O_3$), carbon monoxide (CO), sulfur dioxide ($SO_2$), ammonia ($NH_3$), fine dust of classes PM2.5 or PM10 and/or pollen, and also particle numbers (PN).

Sensors arranged outside the passenger compartment can include an air quality sensor of the motor vehicle, which records the air quality of the outside air, that is to say external (ambient) air outside the passenger compartment of the motor vehicle. However, the sensors arranged outside the passenger compartment can be especially sensors located at measuring stations, in particular public measuring stations, for monitoring the air quality. The measured data of these measuring stations are often made available via a cloud network and can then be wirelessly retrieved by a control device, such as a control device of an air conditioning system of the motor vehicle, or transferred from the cloud to the control device. Prognostic data based on or derived from the measured data and relating, for example, to a prediction about a weather-related distribution of air pollutants can also be considered part of the measured data.

With these measured data and a model for estimating the air quality in the passenger compartment based on that measured data, improved output data indicative of the estimated air quality (following the effects of air treatments such as in filters) can then be made available. The determination of the air quality in a passenger compartment of a motor vehicle can accordingly be improved further by this widening of the data base.

According to one embodiment, output data indicative of the air quality are collected and evaluated at different times in order to determine change data indicative of changes in the air quality in the passenger compartment over time. In other words, the evolution of the air quality over time is recorded and evaluated in order to determine expected changes in the air quality. Any potential deterioration of the air quality can accordingly be counteracted.

According to a further embodiment, the output data are compared with at least one threshold value. Data below the threshold value and above the threshold value can then be assigned different output signals for informing the driver and/or the passengers, such as, for example, visual indicators of different colors, such as, for example, green for below the threshold value and red for above the threshold value. Furthermore, the color yellow can be assigned to values in the region of the threshold value. Instead of colors, different voice messages or expressions, symbols, or sounds can also be used for informing the driver and/or the passengers. The driver and/or the passengers can accordingly be informed about the air quality in the passenger compartment in a particularly simple manner.

According to a further embodiment, the model takes into consideration vehicle-related parameters. Vehicle-related parameters may include values that are representative of the passenger compartment volume, the occupancy thereof, a ventilation flow rate, a fresh air supply rate, closed or open status of the windows and/or vehicle doors and/or sunroofs of the motor vehicle, mixing or recirculation of the air in the passenger compartment, the filtering effect of the passenger compartment filter, leakage of the passenger compartment, a vehicle speed and/or surface losses or deposits, for example of air pollutants such as ozone ($O_3$), ammonia ($NH_3$) or fine dust. Vehicle-specific factors can accordingly also be taken into consideration, and the accuracy of the determination of the air quality in a passenger compartment of a motor vehicle can accordingly be increased again.

The invention also includes a computer program product, a control device, and a motor vehicle having such a control device.

DETAILED DESCRIPTION OF PREFERRED EMBODIMENTS

Figure 1:
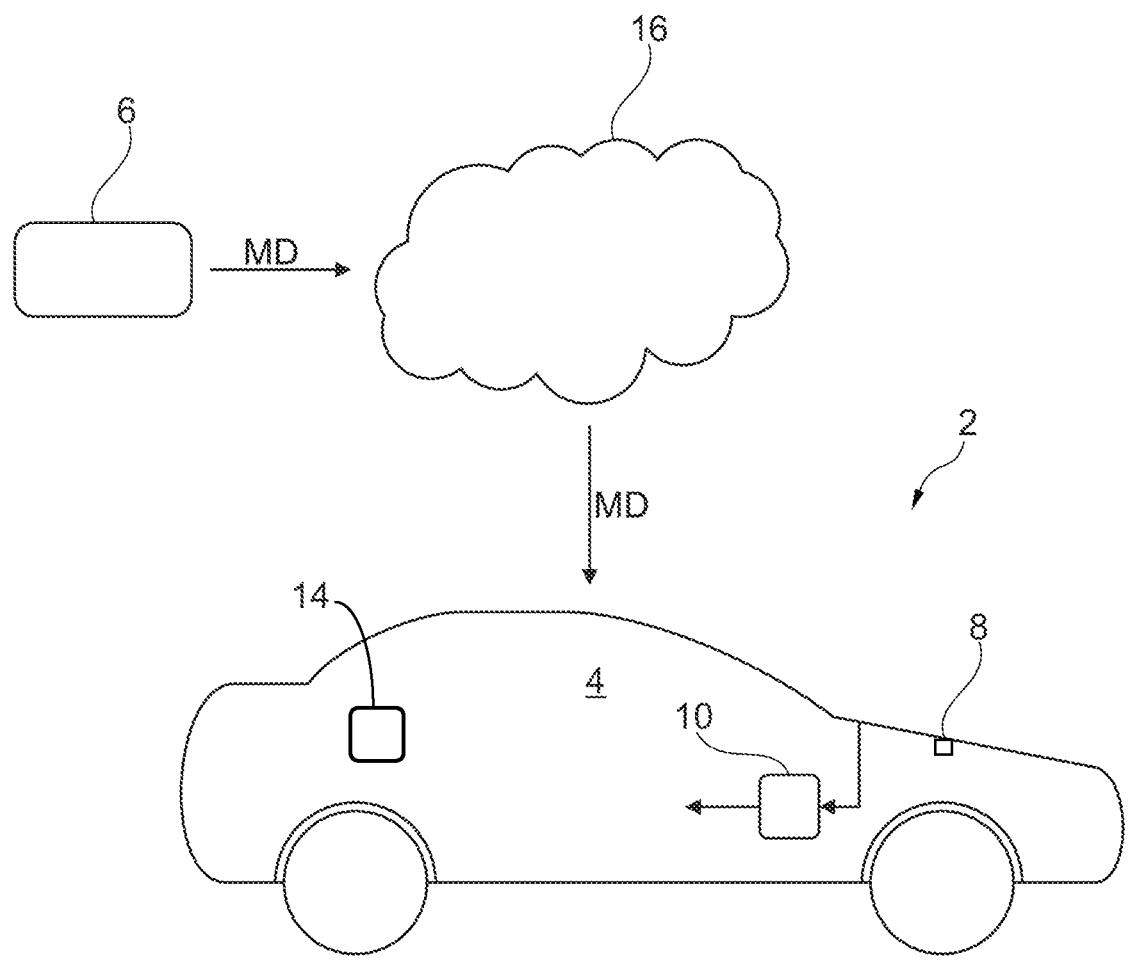
FIG. 1 shows, in a schematic representation, a motor vehicle and further components which are connected to the motor vehicle for data transfer.

Reference will first be made to FIG. 1.

A motor vehicle 2, which in the present exemplary embodiment is in the form of a passenger car, is shown.

In the present exemplary embodiment, the motor vehicle 2 has an air conditioning system (e.g., a heating, ventilation, and air conditioning system, or HVAC) for bringing the air in the passenger compartment 4 into a comfortable temperature and humidity range or for keeping it in such a range. To that end, fresh air from outside the motor vehicle 2, or the passenger compartment 4, is also drawn in and is cleaned by means of a passenger compartment filter 10 before it is blown into the passenger compartment 4. The motor vehicle 2 further has an air quality sensor 8 with which at least one component of the air quality of the air outside the motor vehicle 2 is directly measured, or with which at least one component of the air quality of passenger compartment 4 is measured or can be determined.

In the present exemplary embodiment, the air conditioning system is controlled by a control device 14. The control device 14 and the further components described herein can each have hardware and/or software components for their respective tasks and/or functions.

The control device 14 is configured to establish a connection for wireless data transfer with a cloud network 16. Measured data MD collected by sensors 6 of measuring stations, in particular public measuring stations, for monitoring the air quality are archived in the cloud 16. Accordingly, these are sensors 6 arranged outside the passenger compartment.

The measured data MD can contain values which are representative of a concentration of nitrogen monoxide (NO), nitrogen dioxide ($NO_2$), ozone ($O_3$), carbon monoxide (CO), sulfur dioxide ($SO_2$), ammonia ($NH_3$), fine dust of classes PM2.5 or PM10 and/or pollen, and also particle numbers (PN), for example.

Prognostic data based on or derived from the measured data and relating, for example, to a prediction about a weather-related distribution of air pollutants can also be considered part of the measured data.

Figure 2:
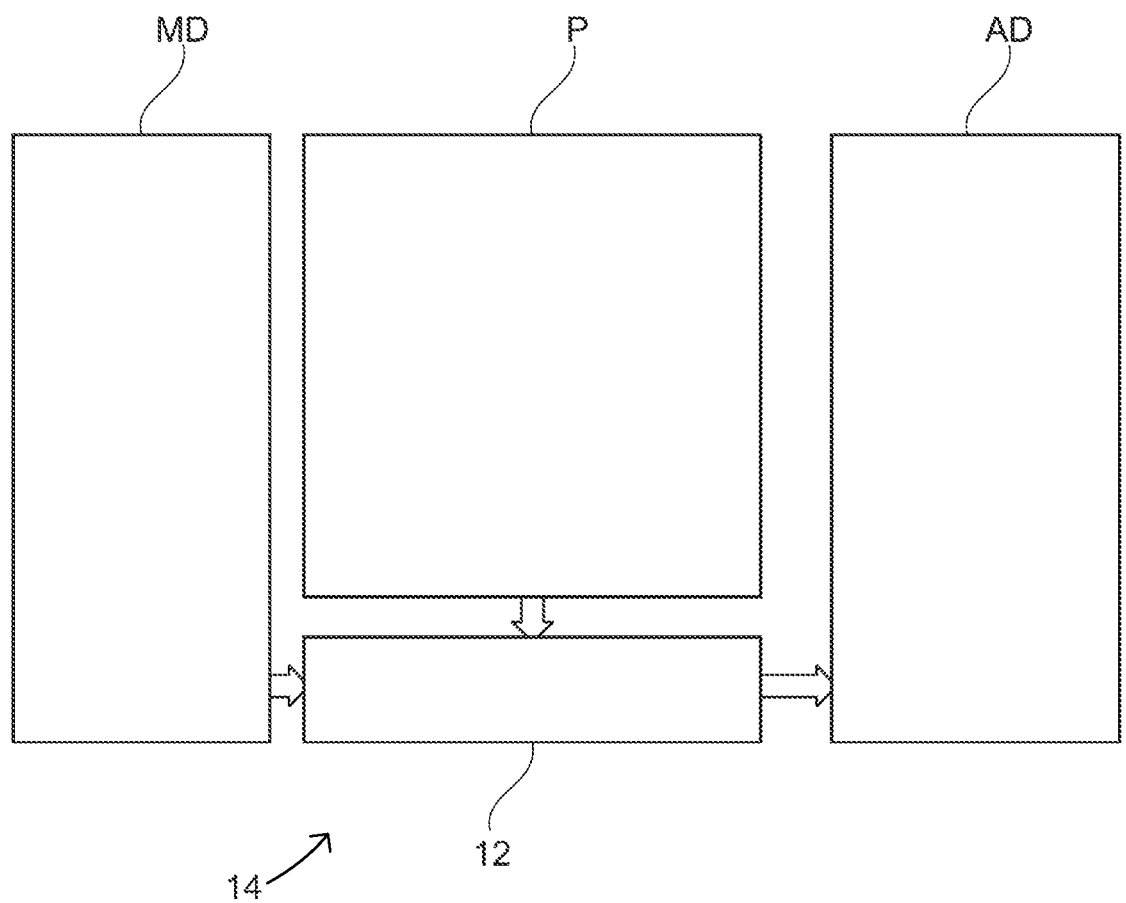
FIG. 2 shows, in a schematic representation, further components of the motor vehicle shown in FIG. 1.

Reference will now additionally be made to FIG. 2.

In order to determine the air quality in the passenger compartment 4 of the motor vehicle 2, the control device 14 has a model 12 to which the measured data MD and vehicle-related parameters P are supplied on the input side and which provides on the output side output data AD indicative of the air quality in the passenger compartment 4. In the present exemplary embodiment, the model 12 is a computer model. In other words, the model 12 is a mathematical model which, owing to its complexity and/or the large number of degrees of freedom, can be evaluated with only a computer (e.g., general purpose processor).

The vehicle-related parameters P can be representative of the passenger compartment volume, the occupancy thereof, a ventilation flow rate, a fresh air supply rate, closed or open state of the windows and/or vehicle doors and/or sunroofs of the motor vehicle 2, mixing or recirculation of the air in the passenger compartment 4, the filtering effect of the passenger compartment filter 10, leakage of the passenger compartment 4, a vehicle speed and/or surface losses or deposits, for example of air pollutants such as ozone ($O_3$), ammonia ($NH_3$) or fine dust. Parameters P may be provided from an electronic memory, from various vehicle-installed sensors, or electronic control modules over a data bus, for example.

The control device 14 is further configured to collect and evaluate at different times the output data AD indicative of the air quality in order to determine change data VD indicative of changes in the air quality in the passenger compartment 4 over time. An evolution of the air quality over time can accordingly be recorded and evaluated in order to determine changes in the air quality.

The control device 14 is further configured to compare the output data AD with the measured data MD in order to determine a filtering effect value FW of the passenger compartment filter 10 of the motor vehicle 2. It is thus determined how high the proportion of air pollutants retained by the passenger compartment filter 10 is.

Finally, the control device 14 is configured to compare the output data AD with at least one threshold value SW. Depending on whether the output data AD, that is to say the measured values of the respective air pollutants, exceed or fall below the respective associated threshold value, different output signals can then be used for informing the driver and/or the passengers. Such signals can be, for example, visual indicators of different colors which are outputted by a display device, such as, for example, an infotainment system of the motor vehicle 2. For example, a visual indicator of the color green can be assigned to output data AD below the threshold value SW and of the color red to output data AD above the threshold value SW. Furthermore, a visual indicator of the color yellow can be assigned to output data AD in the region of the threshold value SW. Instead of the visual indicators, acoustic indicators, such as, for example, different voice messages or expressions, symbols or also sounds can be used for informing the driver and/or the passengers.

Figure 3:
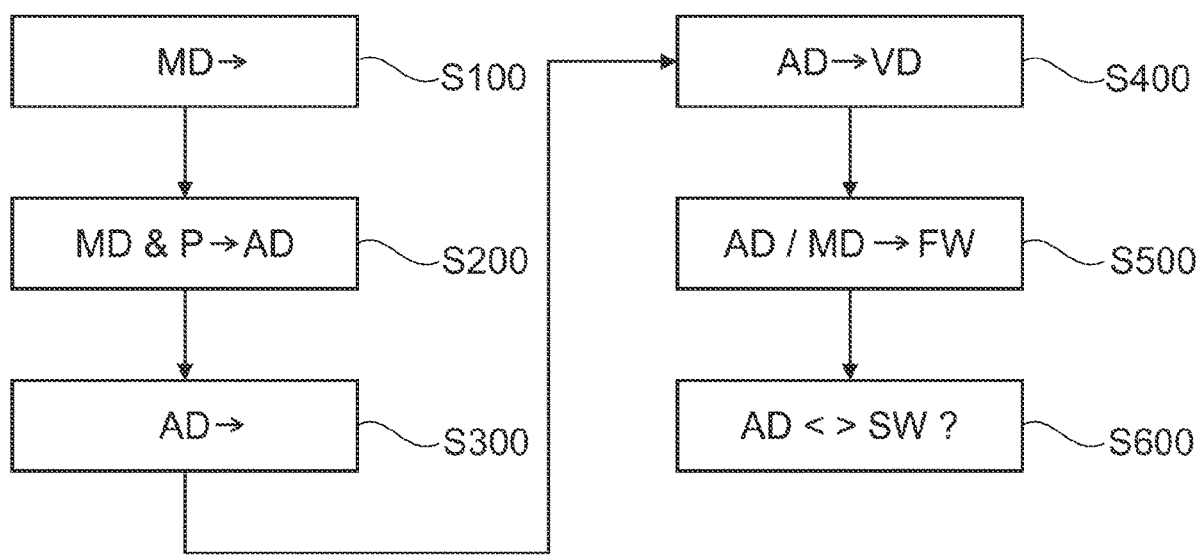
FIG. 3 shows, in a schematic representation, a method sequence for operation of the motor vehicle shown in FIG. 1.

A method sequence will now be described with additional reference to FIG. 3.

In a first step S100, the measured data MD collected by at least one sensor 6 arranged outside the passenger compartment are read in by the control device 14. In addition, the measured data provided by the air quality sensor 8 can be read in.

In a further step S200, for evaluation of the measured data MD, those data, together with the parameters P, are supplied on the input side to the model 12, and the output data AD indicative of the air quality in the passenger compartment 4 are determined by the model 12.

For determining the concentration of unevenly distributed air pollutants, such as, for example, nitrogen dioxide ($NO_2$) or carbon monoxide (CO), the model 12 combines the measured data MD collected by the sensor 6 arranged outside the passenger compartment with the measured data of the air quality sensor 8 of the motor vehicle 2. To that end, the measured data MD are used as the output basis and are combined with the measured data of the air quality sensor 8 in order to determine local values by extrapolation.

In a further step S300, the output data AD are then outputted. Output data AD can be displayed to the vehicle occupants and/or stored electronically.

In a further step S400, change data VD indicative of changes in the air quality in the passenger compartment 4 over time are determined by collecting and evaluating at different times output data AD indicative of the air quality.

In a further step S500, a filtering effect value FW of the passenger compartment filter 10 of the motor vehicle 2 is determined by comparing the output data AD with the measured data MD.

In a further step S600, the output data AD are compared with at least one threshold value SW. As already described, depending on whether the output data AD fall below or exceed the threshold value SW, different output signals AS can then be used for informing the driver and/or the passengers.

In a departure from the present exemplary embodiment, the sequence of the steps may also be different. Furthermore, several steps may also be performed at the same time, or simultaneously. Furthermore, in a departure from the present exemplary embodiment, individual steps may also be skipped or omitted.

Accordingly, the determination of the air quality in the passenger compartment 4 of the motor vehicle 2 can be improved further by this widening of the data base.

What is claimed is:

1. A method for determining an air quality in a passenger compartment of a motor vehicle, comprising the steps of:
    collecting measured data (MD) from at least one sensor arranged outside the passenger compartment which measures a proportion of at least one air pollutant;
    evaluating the measured data (MD) using a model for estimating the air quality in the passenger compartment in response to the measured data (MD) outside the passenger compartment to generate output data (AD) indicative of the estimated air quality inside the passenger compartment; and
    generating an indication perceivable by occupants of the passenger compartment according to the output data (AD) to inform the occupants of the estimated air quality.

2. The method of claim 1 wherein the output data (AD) indicative of the estimated air quality is collected and evaluated at different times in order to determine change data (VD) indicative of changes in the air quality in the passenger compartment over time.

3. The method of claim 1 further comprising the steps of:
    comparing the output data (AD) with at least one threshold value (SW); and
    generating the indication according to a result of the comparison.

4. The method of claim 1 further comprising the steps of:
    collecting vehicle-related parameters (P); and
    inputting the vehicle-related parameters (P) to the model;
    wherein the model further evaluates the vehicle-related parameters (P) in estimating the air quality in the passenger compartment.

5. A non-transitory computer readable media for determining an air quality in a passenger compartment of a motor vehicle, the non-transitory computer readable media, when read by one or more processors, being configured to direct operations comprising:
    collecting measured data (MD) from at least one sensor arranged outside the passenger compartment which measures a proportion of at least one air pollutant;
    evaluating the measured data (MD) using a model for estimating the air quality in the passenger compartment in response to the measured data (MD) outside the passenger compartment to generate output data (AD) indicative of the estimated air quality inside the passenger compartment; and
    generating an indication perceivable by occupants of the passenger compartment according to the output data (AD) to inform the occupants of the estimated air quality.

6. The non-transitory computer readable media of claim 5 wherein the output data (AD) indicative of the estimated air quality is collected and evaluated at different times in order to determine change data (VD) indicative of changes in the air quality in the passenger compartment over time.

7. The non-transitory computer readable media of claim 5 wherein the operations further comprise:
    comparing the output data (AD) with at least one threshold value (SW); and
    generating the indication according to a result of the comparison.

8. The non-transitory computer readable media of claim 5 wherein the operations further comprise:
    collecting vehicle-related parameters (P); and
    inputting the vehicle-related parameters (P) to the model;
    wherein the model further evaluates the vehicle-related parameters (P) in estimating the air quality in the passenger compartment.

9. Vehicle apparatus comprising:
    a passenger compartment;
    a passenger compartment filter cleaning fresh air drawn into the passenger compartment; and
    a control device for determining an air quality in the passenger compartment, wherein the control device is configured to 1) communicate with a remote sensor arranged outside the passenger compartment which measures a proportion of at least one air pollutant in order to read in measured data (MD) collected by the remote sensor, 2) evaluate the measured data (MD) using a model for estimating the air quality in the passenger compartment in response to the measured data (MD) outside the passenger compartment to generate output data (AD) indicative of the estimated air quality inside the passenger compartment, and 3) generate an indication perceivable by occupants of the passenger compartment according to the output data (AD) to inform the occupants of the estimated air quality.

10. The vehicle apparatus of claim 9 wherein the control device is configured to collect and evaluate the output data (AD) indicative of the estimated air quality at different times in order to determine change data (VD) indicative of changes in the air quality in the passenger compartment over time.

11. The vehicle apparatus of claim 9 wherein the control device is further configured to:
    compare the output data (AD) with at least one threshold value (SW); and
    generate the indication according to a result of the comparison.

12. The vehicle apparatus of claim 9 wherein the control device is further configured to:
  collect vehicle-related parameters (P); and
  input the vehicle-related parameters (P) to the model;
  wherein the model further evaluates the vehicle-related parameters (P) in estimating the air quality in the passenger compartment.

* * * * *